(12) United States Patent
Ricciato et al.

(10) Patent No.: US 10,390,215 B2
(45) Date of Patent: Aug. 20, 2019

(54) METHOD AND SYSTEM FOR AUTHENTICATING USERS IN PUBLIC WIRELESS NETWORKS

(71) Applicant: TELECOM ITALIA S.p.A., Milan (IT)

(72) Inventors: Fabio Ricciato, Turin (IT); Nicolo Vaccaro, Turin (IT)

(73) Assignee: TELECOM ITALIA S.p.A., Milan (IT)

(*) Notice: Subject to any disclaimer, the term of this patent is extended or adjusted under 35 U.S.C. 154(b) by 0 days.

(21) Appl. No.: 15/567,724

(22) PCT Filed: Apr. 28, 2015

(86) PCT No.: PCT/EP2015/059138
§ 371 (c)(1),
(2) Date: Oct. 19, 2017

(87) PCT Pub. No.: WO2016/173621
PCT Pub. Date: Nov. 3, 2016

(65) Prior Publication Data
US 2018/0124593 A1 May 3, 2018

(51) Int. Cl.
*H04W 8/18* (2009.01)
*H04W 12/06* (2009.01)
(Continued)

(52) U.S. Cl.
CPC ........... *H04W 8/183* (2013.01); *H04W 8/205* (2013.01); *H04W 12/06* (2013.01); *H04W 84/12* (2013.01); *H04W 60/04* (2013.01)

(58) Field of Classification Search
CPC ..... H04W 8/183; H04W 8/205; H04W 12/06; H04W 84/12; H04W 12/0608
See application file for complete search history.

(56) References Cited

U.S. PATENT DOCUMENTS

| | | | |
|---|---|---|---|
| 9,860,737 B2 * | 1/2018 | Bajko | H04L 29/12047 |
| 2005/0114680 A1 * | 5/2005 | Chinnaswamy | H04L 63/0853 |
| | | | 713/185 |

(Continued)

FOREIGN PATENT DOCUMENTS

| | | |
|---|---|---|
| EP | 2753108 A2 | 7/2014 |
| GB | 2485388 A | 5/2012 |
| WO | 2008/030525 A2 | 3/2008 |

OTHER PUBLICATIONS

International Search Report dated Jan. 20, 2016 in PCT/EP2015/059138, filed Apr. 28, 2015.

*Primary Examiner* — Magdi Elhag
(74) *Attorney, Agent, or Firm* — Oblon, McClelland, Maier & Neustadt, L.L.P.

(57) ABSTRACT

A method for authenticating a user of a user equipment provided with a mobile cellular network card module in a public wireless network. The method includes, during an authentication procedure following an attempt by the user to access the public wireless network with the user equipment for availing of services provided by the public wireless network: retrieving from the mobile cellular network card module a code that uniquely identifies such mobile cellular network card module; retrieving from a database wireless credentials of the user associated with said retrieved code that uniquely identifies such mobile cellular network card module; providing said retrieved wireless credentials of the user to the public wireless network; and granting the user access to the public wireless network conditioned to the correctness of the provided wireless credentials.

13 Claims, 2 Drawing Sheets

(51) Int. Cl.
    *H04W 84/12*     (2009.01)
    *H04W 8/20*     (2009.01)
    *H04W 60/04*     (2009.01)

(56) References Cited

U.S. PATENT DOCUMENTS

| | | | |
|---|---|---|---|
| 2008/0060066 A1* | 3/2008 | Wynn | H04L 61/2015 726/6 |
| 2010/0297983 A1* | 11/2010 | Aarni | H04M 1/66 455/411 |
| 2012/0149330 A1* | 6/2012 | Watson | H04L 63/0853 455/411 |
| 2012/0149334 A1 | 6/2012 | Zhang et al. | |
| 2014/0215583 A1 | 7/2014 | Ding | |
| 2015/0229639 A1* | 8/2015 | Abdulrahiman | H04L 63/0853 455/411 |
| 2016/0014605 A1* | 1/2016 | Robinton | G06F 21/32 726/6 |

* cited by examiner

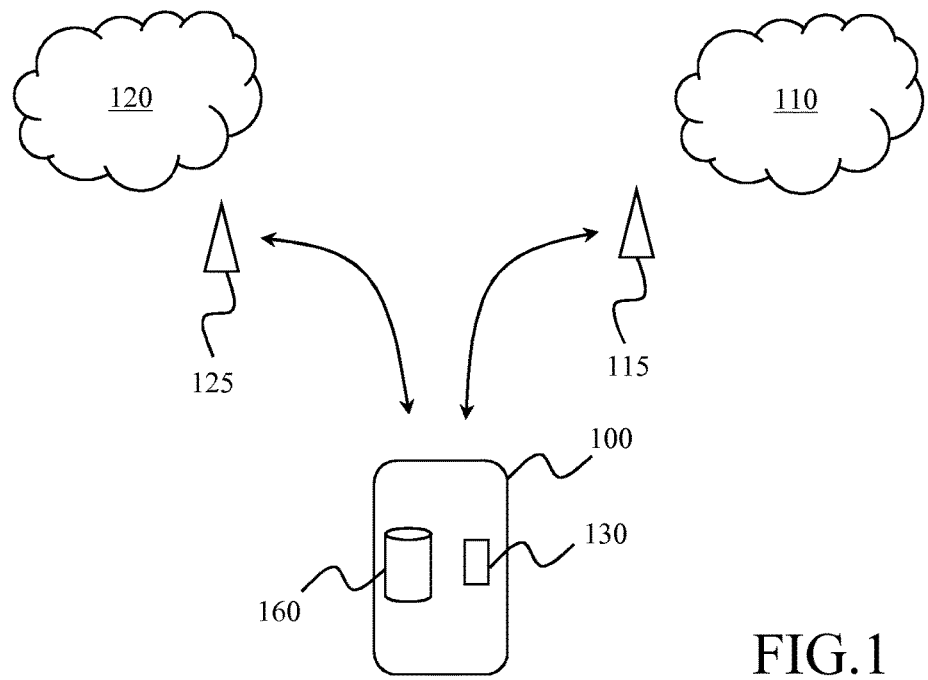
FIG.1
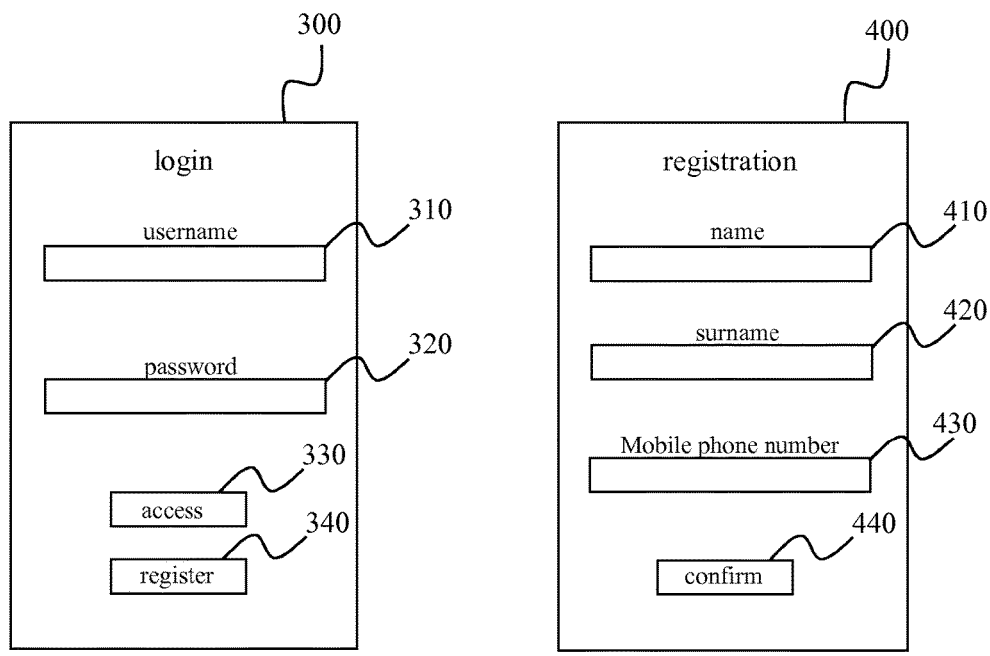
FIG.3
FIG.4

METHOD AND SYSTEM FOR AUTHENTICATING USERS IN PUBLIC WIRELESS NETWORKS

BACKGROUND OF THE INVENTION

Field of the invention

The present invention generally relates to public wireless networks.

Overview of the related art

Nowadays, public wireless networks have become very common. In this document, by public wireless network it is intended any wireless network with public access that does not belong to the category of mobile cellular networks. Examples of communication technologies for mobile cellular networks are Global System for Mobile Communications (GSM), Universal Mobile Telecommunications System (UMTS), Long Term Evolution (LTE). Examples of communication technologies for public wireless networks are Wi-Fi and Wi-Max.

Being specifically designed for the public access, a public wireless network usually requires user authentication before granting a user of a user equipment (such as a mobile phone, a smartphone, a tablet, a portable computer, and so on) to access the network. Therefore, user authentication procedures for public wireless networks have become a very important issue.

In a public wireless network another important issue relates to the identification of users requesting the authentication, and the possibility to trace their data activity on the public wireless network (once the authentication has been successfully carried out) according to possible regulations governing the public wireless network. Moreover, the user identification and the tracing of his/her data activity may be advantageously exploited by the operator of the public wireless network to apply particular data service profiles, and/or to make targeted offers.

Presently, two main authentication procedures for granting access to a public wireless network are typically employed: the authentication procedure based on the IEEE 802.1X standard, and the authentication procedure based on the Universal Access Method (UAM).

The IEEE 802.1X standard, briefly disclosed in White Paper "Introduction to 802.1X for Wireless LANs", 2006, Interlinks Networks LLC, provides a protocol for authentication and port-based access control supporting enhanced access security. This authentication procedure supports different types of credentials such as SIM (Subscriber Identity Module) credentials used by EAP-SIM (Extensible Authentication Protocol SIM). The authentication procedure according to the IEEE 802.1X requires a client software to be installed on the user equipment, and provides for the following operations:

1) The client software installed on a user equipment provided with a SIM corresponding to an operator of a mobile network interacts with a public wireless network for the authentication of the user of such user equipment.
2) The public wireless network interrogates the mobile network corresponding to the SIM.
3) The mobile network checks the credentials of the SIM, and carries out the authentication according to this check.
4) The mobile network provides a response to the public wireless network based on the authentication outcome.
5) The public wireless network grants access to the user equipment conditioned to the response provided by the mobile network.

The UAM authentication procedure, briefly disclosed in "Best Current Practices for Wireless Internet Service Provider (WISP) Roaming", Section 2.1, Wi-Fi Alliance, February 2003, does not require a client software to be installed on the user equipment, since it can be accomplished using a web browser. The UAM authentication procedure provides for the following operations:

1) A user equipment tries to connect to a public wireless network using a web browser for availing of the services offered by the public wireless network (e.g., for surfing web pages).
2) Instead of loading the home page of the user of the user equipment, the web browser loads a specific welcome page of a web portal provided by the operator of the public wireless network, which allows the user to login by manually filling corresponding fields of the welcome page with wireless network credentials (hereinafter, simply referred to as "wireless credentials") for accessing the public wireless network in order to exploit the services offered by the public wireless network. For example, such wireless credentials may be in the form of a username and a password.
3) Authentication is granted to access the home page of the user and surf the web conditioned to the correctness of the wireless credentials provided by the user.

The first time a user tries to login, he/she has to apply for a registration on such web portal. According to the UAM authentication procedure, the registration requires that the user provides through the web portal his/her Mobile Subscriber ISDN Number (MSISDN). In this way, the public wireless network is able to provide the wireless credentials to the user equipment of the user through a text message, such as by means of an SMS. Even if there are other ways to register the user to the web-portal (e.g. e-mail address), the MSISDN is a trusted data to retrieve the user identity in a simple and scalable way.

US 2012149334 discloses a method and system for completing the authentication process of a user device in a second communication network (such as Wi-Fi or WiMAX), which utilizes the user credential (such as a SIM card, a USIM card, or a RUIM card) of a first communication network (such as GSM, CDMA, EDGE, or LTE). A client, such as a software module, executes on the wireless device. An authentication platform retrieves the SIM card credential information in the first communication network and passes the information to the authentication platform of the second communication network, thereby granting the client access to the second communication after the authentication platform validates with the first communication network.

US 2005114680 discloses a method and apparatus for performing SIM-based authentication and authorization in a WLAN Internet Service Provider (WISP) network supporting the universal access method (UAM) of authentication and authorization enabling roaming for customers of mobile service providers onto said networks. In addition, US 2005114680 provides a secure way of authenticating the customer's client device to the mobile service provider's network by employing temporary credentials for authentication that provide privacy of the user's identity and prevent replay attacks. Finally, if the WISP network supports the 'pass-through' facility, the authentication can be done more securely and quickly.

SUMMARY OF INVENTION

The Applicant has recognized that none of the abovementioned prior art documents is able to offer a simple, secure and effective procedure for the user authentication to a public wireless network. Moreover, none of the abovementioned prior art documents is capable of efficiently identifying users requesting the authentication, and/or efficiently tracing the data activity of such user when exploiting the public wireless network.

For example, the procedure based on the IEEE 802.1X standard requires a strong interaction between the public wireless network and the mobile network, and provides for burdening the mobile network with the actual authentication.

Moreover, by using the UAM authentication procedure, the identification of the user is not always trusted, because the user is not uniquely and permanently bound to the wireless credentials received through the text message. For example, once received the wireless credentials on its user equipment through text message, the user may provide them to another user.

Both the solutions disclosed in US 2012149334 and in US 2005114680 are not efficient in terms of implementation times and service maintenance/launch costs.

In view of the above, the Applicant has tackled the problem of providing a simple, secure and effective user authentication procedure to a public wireless network that is capable of efficiently identifying users requesting the authentication, and/or efficiently tracing the data activity of such user when exploiting the public wireless network An aspect of the present invention provides a method for authenticating a user of a user equipment provided with a mobile cellular network card module in a public wireless network. The method comprises, during an authentication procedure following an attempt by the user to access the public wireless network with the user equipment for availing of services provided by the public wireless network:
  retrieving from the mobile cellular network card module a code that uniquely identifies such mobile cellular network card module;
  retrieving from a database wireless credentials of the user associated with said retrieved code that uniquely identifies such mobile cellular network card module;
  providing said retrieved wireless credentials of the user to the public wireless network;
  granting the user access to the public wireless network conditioned to the correctness of the provided wireless credentials.

According to an embodiment of the present invention, the method further comprises, during a registration procedure on the public wireless network which requires the submission of user identity data to the public wireless network itself:
  at a mobile cellular network corresponding to the mobile cellular network card module, automatically retrieving said user identity data by interfacing with the user equipment;
  at the mobile cellular network, automatically providing to the public wireless network said user identity data retrieved by interfacing with the user equipment;
  at the public wireless network, generating the wireless credentials based on the user identity data provided to the public wireless network.

According to an embodiment of the present invention, the method further comprises, during the registration procedure, sending the wireless credentials generated at the public wireless network to the user equipment.

According to an embodiment of the present invention, the method further comprises, during the registration procedure, saving the received wireless credentials and the associated code that uniquely identifies such mobile cellular network card module in the database.

According to an embodiment of the present invention, said database is a local database located at the user equipment.

According to an embodiment of the present invention, said database is a remote database being remote with respect to the user equipment.

According to an embodiment of the present invention, the method further comprises:
  if the database does not store wireless credentials associated with said code that uniquely identifies such mobile cellular network card module, carrying out said registration procedure.

According to an embodiment of the present invention, said mobile cellular network card module comprises at least one of:
  a Subscriber Identity Module card;
  a Universal Subscriber Identity Module card;
  a Removable User Identity Module card,
  a CDMA Subscriber Identity Module, or
  a Universal Integrated Circuit Card.

According to an embodiment of the present invention, said code that uniquely identifies such mobile cellular network card module comprises at least one of:
  a Integrated Circuit Card Identifier;
  a User Identity Module Identifier, or
  a pseudo User Identity Module Identifier.

According to an embodiment of the present invention, said code that uniquely identifies such mobile cellular network card module comprises a International Mobile Subscriber Identity.

Another aspect of the present invention provides for a system comprising a public wireless network and an user equipment provided with a mobile cellular network card module.

The user equipment comprises:
  a unit configured to retrieve from the mobile cellular network card module a code that uniquely identifies such mobile cellular network card module;
  a database configured to store wireless credentials of the user associated with said code that uniquely identifies such mobile cellular network card module;
  a unit configured to retrieve from the database said wireless credentials of the user associated with said code that uniquely identifies such mobile cellular network card module;
  a unit configured to provide said retrieved wireless credentials of the user to the public wireless network.

The public wireless network comprises:
  a unit configured to grant the user of the user equipment access to the public wireless network conditioned to the correctness of the provided wireless credentials.

A still another aspect of the present invention provides for a software client for the authentication of a user of a user equipment provided with a mobile cellular network card module in a public wireless network.

BRIEF DESCRIPTION OF THE ANNEXED DRAWINGS

These and other features and advantages of the present invention will be made apparent by the following description of some exemplary and non limitative embodiments thereof; for its better intelligibility, the following description should be read making reference to the attached drawings, wherein:

FIG. 1 illustrates a possible scenario wherein a public wireless network authentication according to embodiments of the present invention can be applied;

FIG. 3 illustrates a possible example of a login web portal page of the public wireless network illustrated in FIG. 1;

FIG. 4 illustrates a possible example of a page for the registration on the public wireless network illustrated in FIG. 1;

DETAILED DESCRIPTION OF PREFERRED EMBODIMENTS OF THE INVENTION

Figure 2:
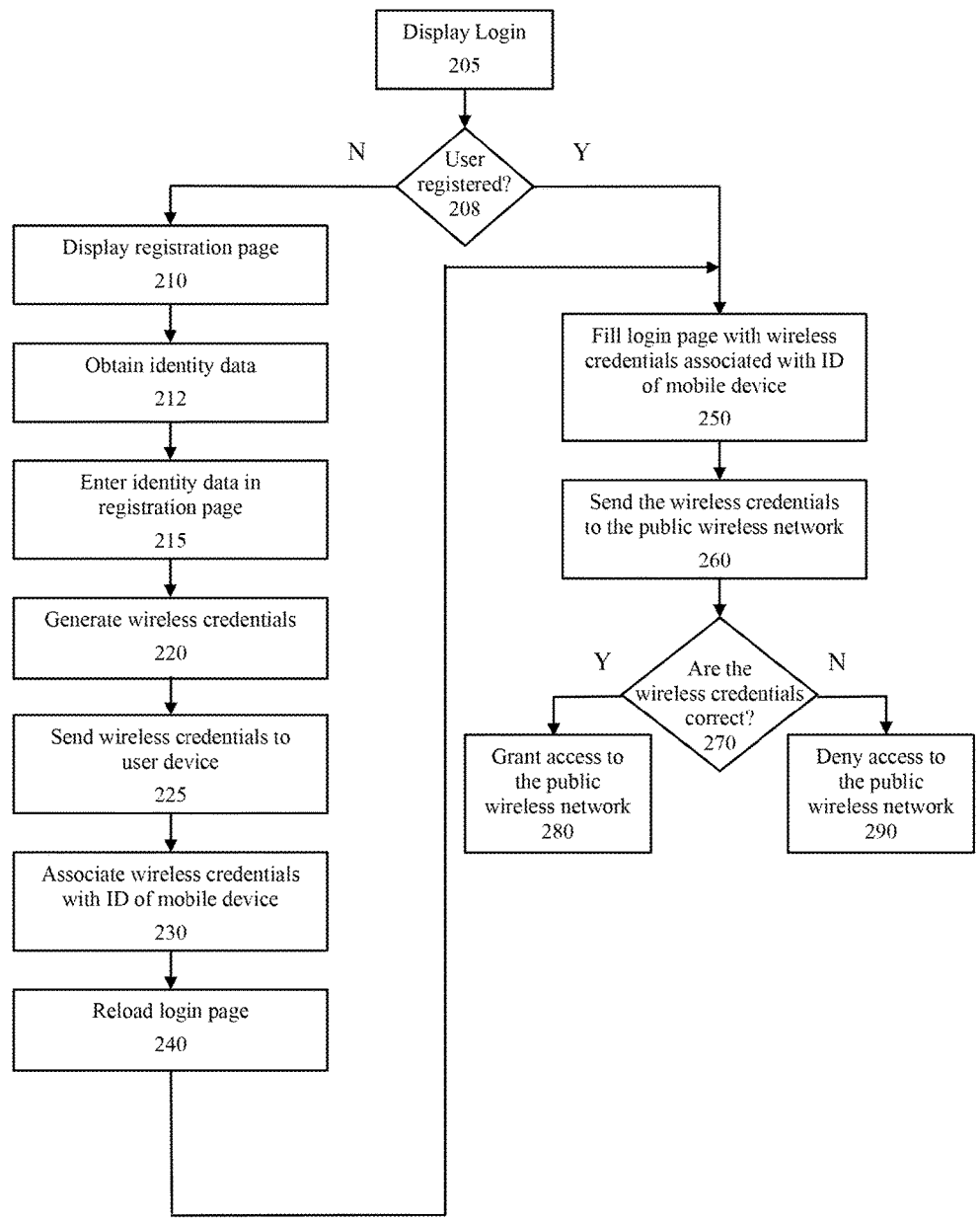
FIG. 2 shows the main phases of the user authentication and identification procedure according to an embodiment of the present invention in terms of functional blocks.

With reference to the drawings, FIG. 1 illustrates a possible scenario wherein a public wireless network authentication according to embodiments of the present invention can be applied.

In the considered scenario, a user equipment 100 (such as for example a mobile phone, a smartphone, a tablet, . . . ) is configured to establish a wireless link with a mobile cellular network 110 (e.g., a LTE network complying with the 3GPP standard) through a plurality (only one illustrated in figure) of mobile cellular network access nodes 115 (e.g., a eNodeB) for exchanging data traffic (e.g., for surfing Internet pages) and voice traffic.

The user equipment 100 is further configured to establish a wireless link, conditioned to the result of an authentication procedure that will be described in detail in the following, with a public wireless network 120 (e.g., a Wi-Fi network) through a corresponding access point 125 (e.g., a Wi-Fi hot spot) for exchanging data traffic (e.g., for surfing Internet pages).

As it is well known to those skilled in the art, in order to interact with the mobile cellular network 110, the user equipment 100 is equipped with a mobile cellular network card module, such as for example a SIM card 130, i.e., a card provided with integrated circuits that securely stores various codes adapted to identify the SIM card 130 itself, as well as codes adapted to uniquely identify the SIM card 130 and the user on the mobile cellular network 110.

Herein below there are summarized some of mobile identification codes that will be exploited in the following of the present description:

ICCID (Integrated Circuit Card Identifier): The ICCID is a code that uniquely identifies each SIM card 130. The ICCID is typically engraved or printed on the SIM card 130 body, and is digitally stored inside a readonly area of an integrated memory circuit of the SIM card 130, for being read through specific software Application Software Interfaces (API). The ICCID is never sent on radio interface. In terms of physical medium, it is associated with IMSI/TMSI (see below).

IMSI/TMSI (International Mobile Subscriber Identity/Temporary Mobile Subscriber Identity): The IMSI/TMSI is a code that uniquely identifies the user and his/her SIM card 130 on the mobile cellular network, and that is adapted to be employed in several procedures, such as authentication and paging over the mobile cellular network 110. The IMSI is digitally stored inside a read-only area of an integrated memory circuit of the SIM card 130 (while the TMSI is a temporary code that is generated based on the IMSI). The IMSI/TMSI can be sent on radio interface.

MSISDN (Mobile Subscriber ISDN Number): The MSISDN represents the mobile number through which the user of the user equipment can be contacted for exchanging voice traffic. The MSISDN it is also used to route calls or text messages. Unlike the previous two codes, the MSISDN cannot be read through software modules. Typically, the MSISDN is only stored in the mobile cellular network 110, and not in the SIM card 130. The MSISDN is associated with the IMSI/TMSI.

As will be described in greater detail in the following of the description, the authentication procedure according to an example embodiment of the present invention is based on UAM authentication procedure, i.e., through a web portal and involving the delivery of wireless credentials (for accessing the public wireless network) by a mobile network through a text message after the registration to such web portal. The delivery of such wireless credentials through a text message enables known paging procedures that involve the use of the IMSI/TMSI to reach the SIM card the user has employed for his/her registration to the web portal by providing to the latter his/her MSISDN. In this way, the wireless credentials and the IMSI/TMSI are bound together, since the act of delivering wireless credentials through text message links the wireless credentials to the specific user having the specific MSISDN used for receiving the text message. Therefore, since IMSI/TMSI identifies user wireless credentials it results to be bound with the user. Moreover, since IMSI/TMSI is associated to ICCID, ICCID can also be used to identify users. According to the UAM authentication, the binding between user and his/her wireless credentials is not permanent, i.e., the user could provide his/her wireless credentials to another different user after the receiving of the text message.

According to an embodiment of the present invention, the authentication procedure provides for binding wireless credentials to ICCID, storing this state permanently, and preventing the user from manually filling-in the login page on the web portal, in such a way to provide a permanent binding between user and his/her wireless credentials.

The authentication procedure according to an embodiment of the present invention is carried out by a software client adapted to run on the user equipment 100 of the user that is trying to access the public wireless network 120 for availing of the services offered by such public wireless network 120. As will be described in detail in the following of the present description, the software client is configured to:

Adapt its behavior to the web portal user is accessing (such as by checking whether the user is already registered or not to the public wireless network 120).

Manage ICCID of the SIM card of the user equipment 100 and wireless credentials.

Use secure procedures when the user logins to the web portal allowing the public wireless network 120 to assess whether he/she is specifically using the software client and not any browser or different clients through which he/she could manually fill the login page (for example, exploiting a signature procedure based on public/private key).

Moreover, the authentication procedure according to an embodiment of the present invention makes use of a database (identified in FIG. 1 with reference 160) that is configured to store permanently information about wireless credentials, web portal and ICCID. Such database may be a local database, located at the user terminal 110, or may a remote database (for example, a cloud database running on a cloud computing platform).

FIG. 2 shows the main phases of the user authentication and identification procedure according to an embodiment of the present invention in terms of functional blocks.

When the user of the user equipment 100 is trying to access the public wireless network 120 for availing of the services offered by the public wireless network 120 (e.g., for surfing web pages), the client installed on the user equipment 100 automatically activates itself and displays a login web portal page (e.g., a captive portal), as in the UAM authentication procedure (block 205).

A possible example of such login web portal page is illustrated in FIG. 3 with reference 300.

The login web portal page 300 comprises input fields to be filled with wireless credentials for the authentication and the access to the public wireless network 120. In the example at issue, said wireless credentials comprises a username and a password, and such input fields comprise a first field 310 for the username and a second input field 320 for the password. The login web portal page 300 further comprises an access command 330, for example an access button, for submitting a request to access the public wireless network 120 by submitting the content of the first and second input fields 310, 320 to the public wireless network 120. The login web portal page 300 further comprises a register command 340, for example a register button, for submitting a request to register the user to the public wireless network 120.

If the user is not yet registered (exit branch N of block 208), the client displays a registration page, as in the UAM authentication procedure (block 210).

A possible example of such registration page is illustrated in FIG. 4 with reference 400.

The registration page 400 comprises input fields to be filled with user identity data. For example, said user identity data may comprise the name, the surname, and the age of the user. In the example at issue, the registration page 400 comprises a first input field 410 for the name of the user, and a second input field 420 for the surname of the user. Moreover, said user identity data further comprise the MSISDN of the user (e.g., the mobile phone number of the user equipment 100), with the registration page 400 that further comprises a corresponding third input field 430 for the MSISDN. The registration page 400 further comprises a confirmation command 440, for example a confirmation button, for confirming the intention to carry out the registration with the user identity data provided in the corresponding input fields 410-430.

According to an embodiment of the present invention, the client automatically interfaces itself with the mobile cellular network 110 in order to obtain the user identity data required for the registration from the operator of the mobile cellular network 110 (block 212). This operation is carried out by performing known authentication procedures of the SIM card 130 of the user equipment 100 on the mobile cellular network 110. These procedures are the same as those usually employed for the registration to the mobile cellular network 110, but with a different purpose, i.e., retrieving the user identity data.

Then, the client automatically fills the input fields 410-430 of the registration page 400 with the user identity data received by the mobile cellular network 110 (block 215).

When the user confirms the registration (for example by pushing the confirmation button), the public wireless network 120 generates corresponding wireless credentials for the authentication of the user (e.g., username and password) based on the user identity data received by the mobile cellular network 110 (block 220).

Then, the public wireless network 120 sends the wireless credentials to the user equipment 100 through a text message (e.g., a SMS) sent by the mobile cellular network 110 (block 225). Said text message is routed by the mobile cellular network 110 to the user equipment 100 by exploiting the MSISDN provided by the public wireless network 120. The public wireless network 120 already knows the correct MSISDN because said identification code is part of the user identity data obtained by the public wireless network 120 at block 212. As it is well known to those skilled in the art, in order to send the text message to the user equipment 100, the mobile cellular network 110 performs a paging operation to reach the IMSI/TMSI which identifies the user and his/her corresponding SIM card 130.

According to an embodiment of the present invention, once the text message comprising the wireless credentials is received by the user equipment 100, the client parses it, extracts the wireless credentials, saves them in the database 160, and associates them with:

the specific web portal used for the registration (e.g., with the name of such web portal), and the ICCID which identifies the SIM card 130 used for the registration on such web portal through the related MSISDN (block 230).

The ICCID of the SIM card 130 may be read by the client through APIs installed in the user equipment 100.

In this way, the wireless credentials for the authentication and the access to the public wireless network 120 are bound with the ICCID of the SIM card 130 used for the registration on such web portal.

According to an embodiment of the present invention, the database 160 may be structured as a table, listing for each public wireless network 120 a user is registered to the following information:

the name of the web portal (e.g. URL of the portal);

the wireless credentials (e.g., username and password);

the ICCID identifying the SIM card 130 used for the registration on the public wireless network 120 through such web portal.

A possible example of such table is provided herein below:

| Portal Name | Username | Password | ICCID |
| --- | --- | --- | --- |
| www.ababa.com | John345 | Aj45F3 | 83152981048274958274 |
| www.cdcd.com | Mike1280 | Xx012 | 94801112894504710043 |
| ... | ... | ... | ... |

According to an embodiment of the present invention, the client supports multiple registrations with multiple SIM cards 130 (i.e., with multiple, different ICCIDs) and for multiple web portals. This means that if the user is registered to a public wireless network 120 through a web portal with many different SIM cards 130, the client is configured to retrieve from the database 160 the correct wireless credentials according to which SIM card 130 is located in his/her user equipment 100 when he/she is trying to access the public wireless network 120 for availing of its services. Similar considerations apply when the user is registered to many different public wireless networks 120 through many different web portals.

At this point, the client loads again the login web portal page 300 (block 240).

According to an embodiment of the present invention, after the login web portal page 300 is loaded again by the client (block 240), or in case the user was already registered to the public wireless network 120 (exit branch Y of block 208), the client identifies the ICCID of the SIM card 130 actually inside the user equipment 130, for example by reading it through a software API, identifies the name of the web portal corresponding to the displayed login web portal page 300, retrieves from the database 160 the wireless credentials (e.g., username and password) corresponding to such pair of identified ICCID and web portal name, and automatically fills the input fields 310 and 320 of the login web portal page 300 with the retrieved wireless credentials (block 250).

Then, once the user submits the request to access the public wireless network 120, for example by pushing the access button 330, the wireless credentials included in the input fields 310, 320 are sent to the public wireless network 120 (block 260).

In this way, according to the present invention, the user is univocally authenticated and identified, because the wireless credentials are permanently bound with the user since the database 160 stores wireless credential that are bound with the ICCID of the SIM card 130 used for the registration, and the client is configured to automatically carry out the registration, avoiding the user to provide the wireless credential to other users.

Once the wireless credentials are received, the public wireless network 120 verifies their correctness. If the wireless credentials are assessed to be correct (exit branch Y of block 270), access to the public wireless network 120 for availing of the offered services is granted to the user (block 280). If instead the wireless credentials are assessed to be incorrect (exit branch N of block 270), access to the public wireless network 120 for availing of the offered services is denied (block 290).

According to an embodiment of the present invention, the client is further configured to use a security system/method to guarantee the authenticity of the client when sending the wireless credentials retrieved from the database 160 to the public wireless network 120, such as for example by exploiting a signature procedure based on public/private key. If the public wireless network 120 verifies the signature of the client request, the public wireless network 120 is capable of assessing whether the user is trying to access the public wireless network 120 by using the client according to the embodiment of the present invention, or by using a different client that allows to manually fill the input fields of the login web portal page 300, strongly increasing the trustworthiness of the user authentication and identification.

Naturally, in order to satisfy local and specific requirements, a person skilled in the art may apply to the solution described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment as a matter of general design choice.

For example, even if in the description reference has been made specifically to user equipments adapted to interact with a mobile cellular network through a SIM card, the concepts of the present invention can be applied as well to other mobile cellular network card modules, such as for example a Universal Subscriber Identity Module (USIM).

Moreover, even if reference has been explicitly made to a mobile cellular network complying with the 3GPP standard, similar considerations apply to any other mobile standard such as the 3GPP2. standard. In this latter case, the SIM card will be replaced by RUIM/CSIM card (Removable User Identity Module/CDMA Subscriber Identity Module), and the ICCID will be replaced by UIMID/pUIMID (User Identity Module Identifier/pseudo User Identity Module Identifier) or by any extended version thereof.

In the scenario described in the present description, the presence of only a single mobile cellular network has been considered. However, the concepts of the present invention can be also applied to a scenario in which two or more different mobile cellular networks coexist, if the user equipment is provided with a mobile cellular network card module capable of managing different types of mobile cellular networks, such as for example a UICC (Universal Integrated Circuit Card), capable of managing both mobile cellular networks complying with the 3GPP standard and mobile cellular networks complying with the 3GPP2. standard. In this case, the local database may be arranged to store wireless credentials to be bound with both ICCID and UIMID/EUIMID.

Moreover, the concepts of the present invention may be also applied to user equipment provided with embedded mobile cellular network card modules. In this case, ICCID/UIMID/pUIMID/EUIMID may be replaced by the hardware identification code of the user equipment (e.g., the Ip Multimedia Private Identity (IMEI)).

The proposed solution supports also the ISIM (Ip Multimedia Services Identity Module Subsystem), which is an application that runs on the UICC card to access IMS (Ip Multimedia Subsystem) networks. In this case, IMSI is replaced by IMPI (Ip Multimedia Private Identity) and MSISDN is replaced by IMPU (Ip Multimedia Public Identity).

In case the IMSI is adapted to be read through APIs, the previously described user authentication and identification procedure according to embodiments of the present invention may be carried out as well by exploiting the IMSI in place of the ICCID.

The invention claimed is:

1. A method for authenticating a user of a user equipment provided with a mobile cellular network card circuit module in a public wireless network, comprising:
   during an authentication procedure following an attempt by the user to access the public wireless network with the user equipment for availing of services provided by the public wireless network:
   retrieving from the mobile cellular network card circuit module a code that uniquely identifies the mobile cellular network card circuit module, the code that uniquely identifies the mobile cellular network card circuit module not being transmitted over the public wireless network;
   retrieving, from a database, wireless credentials of the user associated with said retrieved code that uniquely identifies the mobile cellular network card circuit module, the database storing an address of the public wireless network in association with the wireless credentials and the code that uniquely identifies the mobile cellular network card circuit module;

providing said retrieved wireless credentials of the user to the public wireless network; and granting the user access to the public wireless network conditioned to the correctness of the provided wireless credentials.

2. The method of claim 1, further comprising, during a registration procedure on the public wireless network which requires the submission of user identity data to the public wireless network itself:

at a mobile cellular network corresponding to the mobile cellular network card circuit module, automatically retrieving said user identity data by interfacing with the user equipment;

at the mobile cellular network, automatically providing to the public wireless network said user identity data retrieved by interfacing with the user equipment;

at the public wireless network, generating the wireless credentials based on the user identity data provided to the public wireless network.

3. The method of claim 2, further comprising, during the registration procedure:

sending the wireless credentials generated at the public wireless network to the user equipment.

4. The method of claim 3, further comprising, during the registration procedure:

saving the received wireless credentials and the associated code that uniquely identifies the mobile cellular network card circuit module in the database.

5. The method of claim 4, wherein said database is a local database located at the user equipment.

6. The method of claim 4, wherein said database is a remote database being remote with respect to the user equipment.

7. The method of claim 4 further comprising:

if the database does not store wireless credentials associated with said code that uniquely identifies the mobile cellular network card circuit module, carrying out said registration procedure.

8. The method of claim 1, wherein said mobile cellular network card circuit module comprises at least one of:

a Subscriber Identity Module card;
a Universal Subscriber Identity Module card;
a Removable User Identity Module card,
a CDMA Subscriber Identity Module, or
a Universal Integrated Circuit Card.

9. The method of claim 1, wherein said code that uniquely identifies the mobile cellular network card circuit module comprises at least one of:

a Integrated Circuit Card Identifier;
a User Identity Module Identifier, or
a pseudo User Identity Module Identifier.

10. The method of claim 1, wherein said code that uniquely identifies the mobile cellular network card circuit module comprises an International Mobile Subscriber Identity.

11. The method according to claim 3 wherein sending the wireless credentials generated at the public wireless network to the user equipment comprises sending the credentials via short message service (SMS) messaging.

12. A system comprising:

a public wireless network; and an user equipment provided with a mobile cellular network card circuit module, the user equipment being configured to: retrieve from the mobile cellular network card circuit module a code that uniquely identifies the mobile cellular network card circuit module, the code that uniquely identifies the mobile cellular network card circuit module not being transmitted over the public wireless network;

store wireless credentials of the user in association with said code that uniquely identifies the mobile cellular network card circuit module and an address of the public wireless network;

retrieve said wireless credentials of the user with said code that uniquely identifies the mobile cellular network card circuit module;

provide said retrieved wireless credentials of the user to the public wireless network; and the public wireless network is configured to grant the user of the user equipment access to the public wireless network conditioned to the correctness of the provided wireless credentials.

13. A non-transitory computer readable medium encoded with computer readable instructions that, when executed by a processor, cause the processor to implement a software client for the authentication of a user of a user equipment provided with a mobile cellular network card module in a public wireless network, the software client software being configured to carry out the method according to claim 1.

\* \* \* \* \*